(12) United States Patent
Milwich et al.

(10) Patent No.: US 8,104,392 B2
(45) Date of Patent: Jan. 31, 2012

(54) ROD-SHAPED FIBRE COMPOSITE, AND METHOD AND DEVICE FOR THE PRODUCTION THEREOF

(75) Inventors: Markus Milwich, Oberboihingen (DE); Carsten Linti, Stuttgart (DE); Thomas Stegmaier, Owen (DE); Heinrich Planck, Nürtingen (DE); Thomas Speck, Schallstadt (DE); Axel Herrmann, Stade (DE); Olga Speck, Schallstadt (DE)

(73) Assignee: Deutsche Institute fur Textil-und Faserforschung Denkendorf Stiftung Des Oeffentlichen Rechts, Denkendorf (DE)

( * ) Notice: Subject to any disclaimer, the term of this patent is extended or adjusted under 35 U.S.C. 154(b) by 598 days.

(21) Appl. No.: 11/921,658

(22) PCT Filed: Jun. 8, 2006

(86) PCT No.: PCT/EP2006/005447
§ 371 (c)(1),
(2), (4) Date: Jan. 13, 2009

(87) PCT Pub. No.: WO2006/131344
PCT Pub. Date: Dec. 14, 2006

(65) Prior Publication Data
US 2009/0229452 A1     Sep. 17, 2009

(30) Foreign Application Priority Data

Jun. 9, 2005   (DE) .................... 10 2005 027 879

(51) Int. Cl.
*D04C 1/00* (2006.01)
(52) U.S. Cl. ............................... 87/9; 87/13
(58) Field of Classification Search .............. 87/1, 8, 87/9, 13, 23, 62
See application file for complete search history.

(56) References Cited

U.S. PATENT DOCUMENTS

| | | | |
|---|---|---|---|
| 3,007,497 A | | 11/1961 | Shobert |
| 4,090,002 A | | 5/1978 | Rosenblum |
| 4,494,436 A | * | 1/1985 | Kruesi ............... 87/23 |
| 5,006,291 A | * | 4/1991 | Fish ............... 264/103 |
| 5,127,307 A | * | 7/1992 | Pimpis ............... 87/23 |
| 5,146,835 A | * | 9/1992 | McConnell et al. ......... 87/1 |
| 5,468,327 A | * | 11/1995 | Pawlowicz et al. ......... 156/393 |

(Continued)

FOREIGN PATENT DOCUMENTS

| | | |
|---|---|---|
| DE | 30 25 148 A1 | 1/1982 |
| DE | 40 04 473 A1 | 8/1991 |

(Continued)

*Primary Examiner* — Shaun R Hurley
(74) *Attorney, Agent, or Firm* — The Nath Law Group; Jerald L. Meyer; Robert T. Burns

(57) ABSTRACT

The invention relates to a rod-shaped fiber composite material (400) composed of a matrix (412) and a circular braid (402) embedded into the matrix. To increase the stability of the fiber composite material (400) and also to perform ducting functions for electricity and fluids, the wall of the circular braid is provided with wall chambers (408) which are separated by a phase boundary from the matrix (412) of the fiber composite material (400). These wall chambers (408) lead to inner and outer sections of the wall of the circular braid (402) being spaced apart, which is useful for the stability with regard to flexing and torsional loading in particular. Rod-shaped fiber composite materials (400) according to the invention can be used for creating stable structural components as well as for producing efficiently protected ducts. The invention further relates to an apparatus and a process which are useful for producing fiber composite material according to the invention.

28 Claims, 7 Drawing Sheets

U.S. PATENT DOCUMENTS

| | | | |
|---|---|---|---|
| 5,619,903 A | | 4/1997 | Rogers et al. |
| 5,671,649 A | * | 9/1997 | Piotrowski et al. .................. 87/9 |
| 5,700,533 A | * | 12/1997 | You .............................. 428/36.3 |
| 5,899,134 A | * | 5/1999 | Klein et al. .......................... 87/9 |
| 5,997,970 A | * | 12/1999 | You .............................. 428/36.2 |

FOREIGN PATENT DOCUMENTS

| | | |
|---|---|---|
| EP | 0 072 256 A2 | 2/1983 |
| EP | 0 243 119 A1 | 10/1987 |
| EP | 0 327 085 A1 | 8/1989 |
| WO | 2004/014648 A2 | 2/2004 |

\* cited by examiner

ROD-SHAPED FIBRE COMPOSITE, AND METHOD AND DEVICE FOR THE PRODUCTION THEREOF

BACKGROUND

This invention relates to a rod-shaped fiber composite material having a wall composed of a tube-shaped circular braid formed from right-handed and left-handed helical strands of fiber material and a matrix material embedding the helical strands of the circular braid. The present invention further relates to a process for producing a rod-shaped fiber composite material, in particular a present invention rod-shaped fiber composite material, and also to apparatus for continuous production of a rod-shaped fiber composite material.

Fiber composite materials are generally known. They comprise a matrix material in which the fibers are embedded. The fibers confer on the fiber composite material a stiffness and strength which is high relative to the mass of the material, in particular in fiber direction. The matrix material serves in particular to protect the fibers and to induct the arising forces into the fibers.

Fiber composite materials having a profile- or rod-shaped configuration are also known in particular. Particular fiber composite materials comprise fibers which are at least in part configured as a circular braid which is surrounded by the matrix material. Profiles composed of such a fiber composite material can be utilized to produce very stable structural components. To additionally reinforce such circular braids, it is known to include in the wall of the circular braid further fibers, if appropriate in the form of strands, whose orientation extends essentially in the longitudinal direction of the fiber composite material.

The fiber composite materials mentioned are regarded as disadvantageous in having in relation to their mass a torsional strength and stiffness which is not sufficient or not sufficiently defined for high loads, and also insufficient resistance to buckling.

The present invention has for its object to provide a rod-shaped fiber composite material which compared with existing fiber composite materials can be used at high loads, in particular torsional loads and flexing loads. The present invention further has for its object to provide a process for such a fiber composite material and also apparatus for producing such a fiber composite material.

We have found that this object is achieved by a rod-shaped fiber composite material having a wall composed of a tube-shaped circular braid formed from right-handed and left-handed helical strands of fiber material and a matrix material embedding the helical strands of the circular braid, wall chambers extending in the longitudinal direction of the rod-shaped fiber composite material being formed in the region of the wall of the tube-shaped circular braid between the right-handed and left-handed helical strands and being bounded by a defined phase boundary of the matrix material.

The phase boundaries separate the wall chambers from the matrix and the fibers. They permit a multiplicity of advantageous executions of the fiber composite material, irrespective of whether the phase boundaries are solid-gaseous, solid-liquid or solid-solid. These advantages reside for example in transportation means for media and signals or else in the improvement of mechanical properties of the fiber composite material. A multiplicity of possibilities will now be elucidated in detail.

Useful fiber materials include the fiber materials customarily used for fiber composite materials, examples being carbon fibers, glass fibers, polymeric fibers such as aramid fibers or else natural fibers. Metallic fiber materials can further find use in the circular braid. Useful matrix materials include for example plastics, in particular synthetic resins such as polyurethane, polyester, polyether-ketones, or else glass materials or concrete. Possible matrix materials further include thermoplastics such as PBT, polypropylene and polyamide and also elastomers such as neoprene and rubber. Natural matrix systems can also be advantageous. Means for incorporation include direct injection of the matrix material, in situ polymerization or else the use of hybrid yarns comprising fiber material and a matrix material which is heated in the course of production.

The tube-shaped circular braid has a cylindrical shape which, depending on the required performance profile, can have a wide variety of cross sections or can be brought into a wide variety of cross sections. Circular braids normally have a circular cross section. For applications where the rod-shaped fiber composite material is configured to accommodate one or more lines for power or fluids, circular cross sections are regarded as advantageous. However, elliptical, polygonal or more complex cross sections are also conceivable for example and advantageous in specific instances, for example in relation to the production of structural components, for example for chassis building. The circular braid comprises helical strands of two different orientations, which are interbraided in a conventional manner to form a stable ensemble. The helical strands are in part left-handed and in part right-handed. The braided structure wall has crossing zones which extend in the longitudinal direction of the circular braid and in which the left and right-handed helical strands cross. Between these crossing zones, extending in the longitudinal direction of the circular braid, the present invention provides wall chambers which are likewise oriented in the longitudinal direction and which each reside between the left-handed and right-handed helical strands. Viewed in the circumferential direction, wall chambers having either the right-handed helical strands on the outside and left-handed helical strands on the inside or else the left-handed helical strands on the outside and the right-handed helical strands on the inside lie side by side and alternate. Owing to these wall chambers, the right and left-handed helical strands are further spaced apart perpendicularly to the wall of the circular braid, compared with a normal circular braid. The matrix material into which the circular braid has been embedded bounds the wall chambers on the outside and on the inside and has a defined phase boundary in relation to the wall chambers. The wall chambers themselves preferably have a round or elliptical cross section. In relation to the rod-shaped fiber composite material of the present invention it may be preferable to provide a core tube in the interior of the circular braid in a known manner. The core tube may also be filled, for example for stabilizing purposes. Thus, depending on the application scenario, it is for example an option to fill the interior of the circular braid completely with optionally foamed matrix material and optionally further fiber material, so that only the wall chambers are free of fiber material and matrix material of the circular braid.

The fiber composite material of the present invention has high torsional strength and stiffness and is also very buckling resistant and highly pressure resistant. The properties of the fiber composite material may if appropriate be additionally application-enhanced by fillings or inlays into the wall chambers. This can reach such a point that the stability of the fiber composite material is essentially due to the inlays or fillings and the circular braid essentially only serves to stabilize these inlays against buckling and/or change in position. In addition, the wall chambers can also serve as transportation paths for liquids and gases or else accommodate lines for transporting electrical energy or electrical or optical signals.

In one further development of the fiber composite material, fiber longitudinal strands likewise embedded in the matrix material within and/or outside the circular braid extend essentially in the longitudinal direction of the rod-shaped fiber composite material.

These fiber longitudinal strands are particularly suitable for keeping the volume of the matrix material small and for absorbing tensile forces acting in the longitudinal direction. The fiber longitudinal strands can consist of the same fiber material as the circular braid or a different fiber material than the circular braid. It is particularly preferable when the fiber longitudinal strands are inserted into interstitial cutouts which extend in the longitudinal direction and which result, inside and outside the circular braid, in the region of the crossing points between left and right-handed helical strands.

In one further development of the fiber composite material, at least one and preferably all of the wall chambers are filled.

Such a filling can have a positive influence on the properties of the rod-shaped fiber composite material. As well as filling all wall chambers, it may also be preferable to fill just some of the wall chambers to improve the material properties and to leave others unfilled, for example for gas transportation. The filling in the wall chambers is preferably introduced into the wall chamber during the manufacturing operation. It may be preferable, depending on the application scenario, to provide in the wall chambers a filling which is inlaid therein as a prefabricated inlay of defined phase boundary and which, depending on its form of introduction, terminates flush with the matrix material or sits only loosely in the wall chamber. Alternatively, fillings which are introduced into the wall chambers in liquid form in particular and cure or consolidate therein are also convenient.

In one further development of the fiber composite material, a line, in particular an electrical line or an optical wave guide, is inlaid into at least one of the wall chambers.

Using wall chambers to transmit electrical energy or electrical or optical signals is regarded as advantageous particularly whenever a core tube in the fiber composite material is intended to transport fluids, for example, and therefore no lines can be accommodated there. The lines can either be configured such that they completely fill the wall chamber and terminate flush with the matrix material, or that they are merely inlaid and remain mobile in the longitudinal direction of the fiber composite material. The inlaid line may have an isolating/insulating layer, but depending on the matrix material used it is also possible to use directly inserted guides/conductors without isolating/insulating layer. It may further be preferable to inlay a plurality of lines together in a previously cured wall chamber.

In one further execution of the present invention, at least one wall chamber is configured as a line for transportation of fluids or a line for transportation of fluids is inlaid into at least one of the wall chambers.

For this purpose, the wall chamber may have been provided with a separate line which is preferably introduced during the manufacturing operation of the fiber composite material, or else the wall chamber is itself directly used as a duct whose wall is bounded by the matrix material of the fiber composite material. When a separate line is used, both a line which completely fills out the wall chamber and a line which is movable at least to some extent in the longitudinal direction may be advantageous.

In one further development of the fiber composite material, at least one of the wall chambers, preferably all wall chambers, contain an inlaid stabilizing inlay which fills out the wall chamber and has a defined external area, in particular a stabilizing bar.

Such a stabilizing inlay preferably fills out each wall chamber completely and has a common phase boundary with the adjoining matrix material. Bars composed of fibers embedded in a binder, in particular carbon fibers embedded in a binder, are regarded as particularly advantageous. The stabilizing inlays make it possible to adapt the properties of the fiber composite material in a specific manner to specific requirements, in which case particularly tensile and compressive loads can be efficiently absorbed. The stabilizing inlays may also be configured such that they absorb a large proportion of the loads which arise, in which case their being braided into the circular braid ensures their being held safely in their position without any danger of their giving away or of changing their position. The stabilizing inlays, in particular the stabilizing bars, can be prefabricated to have defined predetermined properties.

In one further development of the fiber composite material, the phase boundaries separating the wall chambers and their respective contents from the matrix are smooth and the wall chambers have a cross section uniform in the longitudinal direction.

Wall chambers of this design are comparatively simple to produce by introducing into the circular braid, in the region of the wall chambers, in the course of a continuous manufacturing operation, a mold core which, depending on the application scenario, remains in or is pulled out or otherwise removed, in particular dissolved out, from the fiber composite material after consolidation of the matrix.

In a further development of the fiber composite material, within and/or outside the tube-shaped circular braid there is provided a further tube-shaped circular braid embedded in the matrix material, the further tube-shaped circular braid preferably likewise having wall chambers arranged in the region of the wall between right-handed and left-handed strands and oriented in the longitudinal direction of the tube-shaped circular braid and separated from the matrix material by a phase boundary.

Such a fiber composite material, comprising a plurality of circular braids, preferably each with wall chambers, has even further enhanced buckling resistance and torsional strength. The increased number of wall chambers also permits particularly flexible adaptation to specific requirements, for example by the wall chambers of the outer circular braid being used for inlaying stabilizing inlays and the wall chambers of the inner circular braid being used for inlaying ducts, in particular electrical lines or optical wave guides, particularly well protected by the outer circular braid.

The present invention further provides a process for producing a rod-shaped fiber composite material having a tube-shaped circular braid formed from left and right-handed helical strands and a matrix embedding the helical strands, preferably for producing a fiber composite material according to the present invention. In this process the tube-shaped circular braid is braided around rod-shaped wall chamber formers disposed in the region of the circular braid wall as mold cores to form a defined phase boundary, the wall chamber formers being braided into the region between crossing left and right-handed helical strands and subsequently the matrix material for forming the matrix embedding the helical strands of the circular braid and for forming the defined phase boundary is introduced into the circular braid, the wall chamber formers remaining in the wall chambers at least until the matrix material is at least partly consolidated or cured. The process is useful for continuous operation.

The process commences with a conventional continuous braiding operation in which the helical strands used are braided around the wall chamber formers, so that these cause the inner right-handed and outer left-handed helical strands on the one hand and the inner left-handed and outer right-handed helical strands on the other to be spaced apart. Introducing the matrix material, which embeds and consolidates the helical strands, causes the wall chambers to be brought into a permanent shape and the defined phase boundaries formed, and they also persist when the wall chamber formers move out of the wall chambers after at least partial consolidation or curing of the matrix material in the course of the continuous advance of the fiber composite material produced. Alternatively, however, the wall chamber formers can also be configured as lost mold cores, which remain in the wall chambers.

In a further embodiment of the production process, the wall chamber formers are intended to remain in the rod-shaped fiber composite material and are fed continuously to the braiding operation, the wall chamber formers being configured as stabilizing bars in particular.

The feeding is preferably realized in the region of a circular braiding apparatus having flyer wheels for transporting spools, the wall chamber formers being fed through a cutout in the center of these flyer wheels. The wall chamber formers may be configured not only to positively influence the material properties of the fiber composite material but also to be able to serve directly to transport fluids or electrical power or electrical and optical signals. The use of stabilizing bars makes it possible to produce a fiber composite material wherein the circular braid and the matrix material primarily serve to keep the stabilizing bars in position and to prevent any giving way and also positional changes on the part of the latter, while the stabilizing bars bear the main loads.

In one further development of the production process, the wall chamber formers for forming free wall chambers are configured stationarily and continuously move out of the wall chambers formed in the region of the at least partly cured or consolidated matrix.

The wall chamber formers in this case thus serve only to shape the wall chambers and to form the defined phase boundaries without remaining in the wall chambers. Such wall chamber formers are likewise preferably disposed in the region of the flyer wheels of the circular braiding machine, and extend in the transportation direction of the fiber composite material into a region downstream of a feed region for the matrix material in which the matrix material is at least consolidated to such an extent that the wall chambers are stable after the wall chamber formers have moved out. This process is technically not very demanding, and can be carried out with only minimal modifications to commercially available braiding machines. For this purpose, these braiding machines are equipped for example in the region of their flyer wheels with preferably rodlike wall chamber formers which extend at least as far as into an apparatus for introducing the matrix into the wall.

In a further development of the production process, during the continuous moving out of the wall chamber formers a wall chamber filling is introduced into the wall chamber surrounded by at least partly cured matrix material. The feeding of the wall chamber filling is preferably effected through the stationary wall chamber formers which are tubular for this purpose. An apparatus for introducing the wall chamber filling into the wall chamber formers is preferably part of the braiding apparatus. The feeding takes place as a function of the speed of advance of the fiber composite material produced.

In one further development of the production process, the filling is configured as a prefabricated solid continuous inlay.

This inlay may for example be stored, and continuously fed, on rollers in the region of the braiding apparatus. Depending on the intended application, these inlays can perform transportation purposes, for example for gases and liquids or else for electricity or electric signals. Such continuous inlays, when compared with inlays which are not introduced through stationary wall chamber formers but are themselves configured as lost wall chamber formers, are mobile, which may be advantageous, in the longitudinal direction of the fiber composite material in the inlaid state even after the matrix material has undergone consolidation. This avoids the risk for example of the inlay being injured when the final fiber composite material is pressed into curves having narrow radii in the course of its use.

In one further development of the production process, the filling is introduced as a flowable medium, for example as a foam material, which consolidates, in particular cures, after introduction in the wall chamber.

For this purpose, the flowable material is preferably fed under pressure through the wall chamber formers to the wall chamber which it completely fills out and in which it subsequently turns solid. Such a filling can improve the properties of the fiber composite material in various ways.

In one further development of the production process, the circular braid is shaped before consolidation or curing of the matrix material, in particular before the embedding into the matrix material.

This makes it possible to endow the fiber composite material produced by the process with a shape, in particular a cross-sectional shape, which is very difficult or impossible to produce in the course of the original production of the circular braid. The shaping may be caused by forces acting on the circular braid from the outside or from the inside. The shaping can also be effected by the fiber composite material being influenced in its longitudinal direction, for example through slightly screw-shaped secondary chamber formers, which result in screw-shaped wall chambers.

In a particularly advantageous further development, the shaping takes place with regard to the cross section, in particular through a force emanating from the wall chamber formers and/or from bounding external or internal surfaces of a mold.

The wall chamber formers may for this purpose have an arrangement which changes the direction of advance of the fiber composite material. It may be preferable for example for the wall chamber formers to be disposed on a circle circumference in the region in which the circular braid is produced and in the further course to assume for example a rectangular arrangement or an arrangement in the form of the cross section of a C-, T-, L- or LZ-beam, so that the circular braid is, in the course of its continuous advance, pressed into this shape before or while the matrix material is being introduced or consolidates.

In one further development of the production process, at least two circular braids guided inside each or one another and the matrix material are joined together to form a rod-shaped fiber composite material, the wall chamber formers for forming the defined phase boundary being braided into at least one of the circular braids.

Such a process can be carried out in one or more stages. A one-stage process produces concurrently two circular braids of which at least one, preferably both, are provided with wall chambers by wall chamber formers. The two circular braids are preferably firmly bonded to each other using a conjoint matrix material.

In another further development of the production process, the process is carried out in two or more stages, a rod-shaped fiber composite material produced in the first stage, comprising a first circular braid, being surrounded in a second stage with a second circular braid and being connected to the latter by the matrix material.

It is preferable here to use identical matrix materials and fiber materials. In the case of for example different loads to be expected to react on the outer surface of the fiber composite material and on the wall of a core tube, it may also be preferable to use a second matrix material and/or a second fiber material for the second stage and hence the outer layer of the fiber composite material produced, which differ from the respective matrix and fiber materials used in the first stage.

The present invention also provides an apparatus for continuous production of a rod-shaped fiber composite material comprising a braiding apparatus configured for braiding a circular braid, an applying apparatus for applying a matrix material to helical strands of the circular braid and a curing apparatus for curing the matrix material, wherein the braiding apparatus comprises rod-shaped wall chamber formers of defined cylindrical external surface which are disposed such that they are braided into the wall of the circular braid and extend through the applying apparatus into a region of the curing apparatus in which the matrix material has been at least partly cured or consolidated.

The braiding apparatus comprises a conventional braiding apparatus for producing circular braids, although wall chamber formers are attached to the braiding apparatus in the region of spools of the braiding apparatus, preferably where the braiding apparatus has flyer wheels. These wall chamber formers extend essentially in the direction of transportation of the fiber composite material, and serve to being braided around with the helical strands of the circular braid. The wall chamber formers extend through the applying apparatus in which the circular braid is embedded into the matrix material, defining wall chambers which are excluded from having matrix material introduced to them and so form the defined phase boundary. The identity of the matrix can be adapted to various requirements in many respects, for example by the choice of the matrix material or by foaming to reduce the density of the material. The wall chamber formers end in or behind the curing apparatus in which the matrix material is cured or consolidated. When, in the course of the continuous advance of the fiber composite material produced, the wall chamber formers are thus continuously moved out of the wall chambers, stable wall chambers remain behind owing to the curing or consolidation. The wall chambers endow the fiber composite material produced using such an apparatus with a high degree of stability coupled with low mass, and also permit the performance of specific functions, for example in the region of fluid or energy transportation. A particular embodiment is advantageous when hybrid yarns are used. Hybrid yarns consist of reinforcing fibers on the one hand and matrix filaments, for example thermoplastic filaments, on the other. In the case of these hybrid yarns, the fiber material and the matrix material are conjointly braided together by means of the braiding apparatus. The office of the applying apparatus in this case is not to feed the matrix material, but only to heat it sufficiently for homogeneous distribution on the fibers. The curing apparatus is configured as a cooling apparatus in this case.

In one further development of the production apparatus, the applying apparatus for applying the matrix material and the curing apparatus are configured as a unitary apparatus.

The curing apparatus preferably merely comprises a curing and shaping sector in the course of which the matrix material is guided on the external surface and in the course of which the matrix material is consolidated. Depending on the embodiment, a mold core may additionally be provided in the interior to define a clear core tube during consolidation.

In one further development, the production process comprises an appliance for reshaping the circular braid after its production.

Such a refinement permits a particularly flexible adaptation of the circular braid and of the fiber composite material to performance requirements. The apparatus comprises for this purpose a sub-apparatus which permits a targeted force acting on the circular braid. This can be a mold core within the circular braid, whose cross-sectional area varies in the advance direction by for example having in the region of the braiding apparatus a round cross section whose shape develops in the advance direction into a rectangular shape for example. Of advantage may also be, in lieu or in addition, a shaping apparatus which is disposed outside the circular braid and which presses the circular braid into a desired shape in the course of the continuous advance of the circular braid. The combination of a shaping mold core within the circular braid with a shaping apparatus outside the circular braid permits particularly flexible shapings of the circular braid with cross sections comprising concave and convex regions of walling.

In one further development of the production apparatus, the wall chamber formers are shaped such that a pattern formed by the wall chamber formers changes downstream of a region in which the circular braid is produced compared with the original pattern such that the circular braid produced is continuously changed with regard to its shape, in particular with regard to its cross section.

This further development makes it possible to achieve a continuous shaping of the circular braid without additional shaping apparatuses disposed inside or outside the circular braid. As the circular braid is further transported in the direction of advance, the arrangement of the wall chamber formers, which likewise changes in the direction of advance, leads to a shifting of the wall chambers of the circular braid and consequently to a continuous change in the shape of the circular braid, for example with regard to its cross section proceeding from a circularly round braid to a circular braid in the form of a T-beam. It may also be advantageous to achieve a screw-shaped form for the wall chambers via wall chamber formers disposed and helically configured in the same direction.

In one further development of the production apparatus, the wall chamber formers are tubularly hollow.

Such a development makes it possible to feed the wall chambers with a filling during the production of the fiber composite material.

In one further development of the production apparatus, the wall chamber formers are configured to feed a solid inlay into the wall chambers formed by the wall chamber formers.

The solid inlay is preferably stocked on spindles or in the form of rod material in the region of the braiding apparatus, and continuously fed through the wall chamber formers into the wall chambers. Advantageous inlays can serve not only the stability of the fiber composite material but also comprise inlays performing specific functions in the region of fluid or electricity transportation.

In one further development of the production apparatus, the wall chamber formers are configured to feed a pressurized flowable medium into the wall chambers produced by the wall chamber formers which consolidates or cures after introduction into the wall chambers.

This makes it possible to positively influence the material properties of the fiber composite material in a specific manner by feeding a filling into the wall chamber.

These and further features will be apparent from the description and the drawings as well as the claims, and the individual features may each be actualized on their own or as a plurality in the form of subcombinations in any one embodiment of the invention and in other fields and may constitute advantageous embodiments which are protectable in their own right and for which protection is claimed herein.

BRIEF DESCRIPTION OF THE DRAWINGS

Illustrative embodiments of the invention are schematically depicted in the drawings and will now be more particularly described. In the drawings.

DETAILED DESCRIPTION

In the various embodiments of the fiber composite material and the various embodiments of the production apparatus, the second and third digits of the reference symbols for mutually comparable components are in agreement in each case.

The profiles of the inventive fiber composite material which are depicted in the illustrative embodiments of FIGS. 1 to 5 can have very different designs with regard to their cross-sectional dimensions. The profiles can have a diameter of a few millimeters and a cross-sectional area of a few square millimeters. To produce structural components, for airplanes, for example, however, distinctly larger diameters up to in the range of several decimeters are also conceivable. Particularly preferred embodiments have diameters in the region of a few centimeters, for example a diameter of 2 centimeters coupled with a wall thickness of 5 mm in the region on the wall chambers and a clear wall chamber cross-sectional area of about 10 square millimeters, which in the case of circular cross sections for the wall chambers corresponds to a clear wall chamber diameter of about 3.5 mm.

The circular braids depicted in these illustrative embodiments each have a pitch angle for the helical strands based on longitudinal and circumferential direction of about 10° to 20°. Depending on the planned use for the fiber composite material and depending on the number of helical strands and the cross-sectional dimensions of the overall profile and also of the wall chambers, however, smaller and larger pitch angles can also be advantageous. An advantageous pitch is lower for higher bending strength requirements and higher, up to between 50° and 60°, for higher torsional strength requirements.

Figure 1:
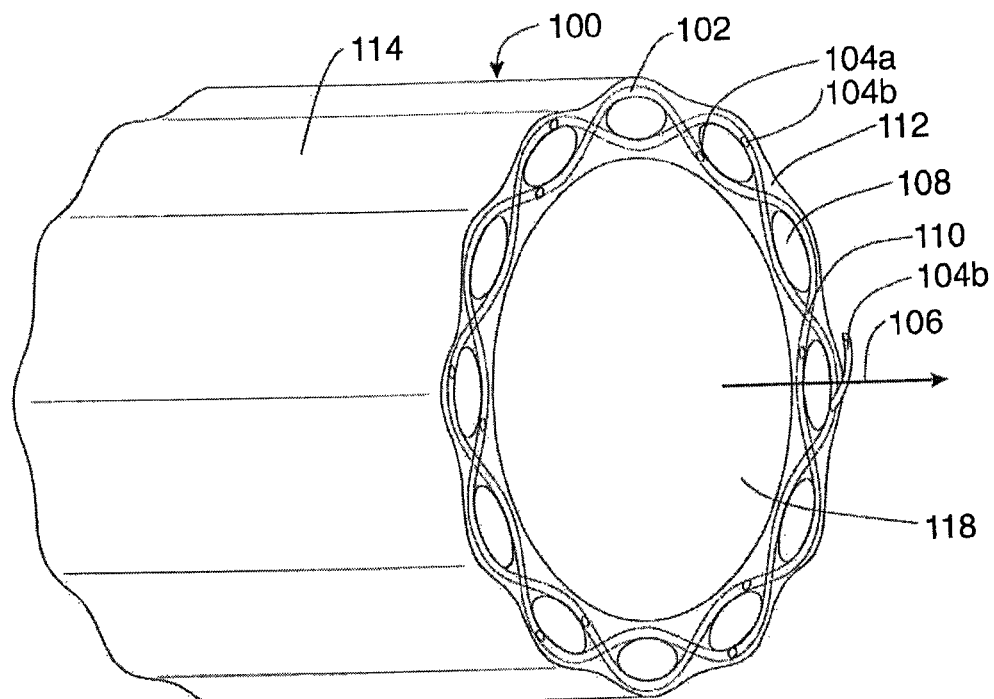
FIGS. 1 to 5 show various embodiments of inventive fiber composite materials.
Figure 2:
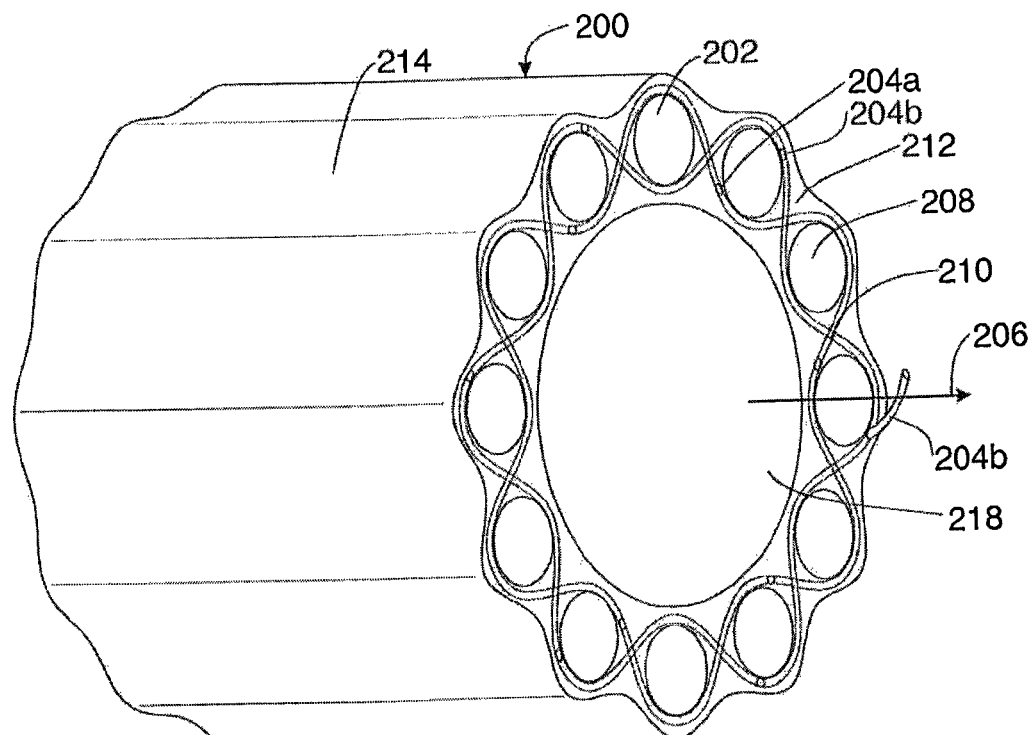

FIGS. 1 and 2 show very simple embodiments of the inventive profilelike fiber composite material. The fiber component of these fiber composite materials 100, 200 is formed by circular braids 102, 202 which consist of helically extending fiber strands 104a, 104b, 204a, 204b. Of these fiber strands 104a, 104b, 204a, 204b, altogether twelve of each are provided in the circular braids 100, 200, and in turn of these in each case six fiber strands 104a, 204a are braided into the circular braids 102, 202 in the clockwise sense in the advance direction 106, 206 in the perspective of FIGS. 1 and 2 and in each case six fiber strands 104a, 204b are braided into the circular braids 102, 202 helically counterclockwise in the advance direction 106, 206 in the perspective of FIGS. 1 and 2. The fiber strands 104a, 104b, 204a, 204b are braided such that in each case altogether twelve wall chambers 108, 208 are left in the wall of the circular braid 102, 202. These wall chambers 108, 208 are each disposed between crossing zones 110, 210 in the wall in the circumferential direction, the left-handed fiber strands 104a, 204a and the right-handed fiber strands 104b, 204b being superposed in these crossing zones 110, 210 in a plan view in the direction of the advance direction 106, 206. The wall chambers of the two circular braids 102, 202 differ from each other in their cross-sectional shape: The wall chambers 108 in circular braid 102 have circular cross-sectional areas, while the cross-sectional areas of the wall chambers 208 in circular braid 202 have an elliptical shape. The circular braids 102, 202 are each surrounded by a matrix material 112, 212 which forms an outer wall 114, 214 for the fiber composite materials 100, 200. Within the fiber composite materials 100, 200, the wall chambers 108, 208 and also in each case a core tube 118, 218 are free in each case not only of fiber strands but also of the matrix 112, 212 formed by the matrix material. The matrix 112, 212 is cured in the state depicted in FIGS. 1 and 2, so that the cross section which is depicted for the wall chambers 108, 208 is the final cross section.

The depicted fiber composite materials 100, 200 have high stability and stand up well to high torsional loads and flexing loads in particular. The free wall chambers 108, 208, which lead to a radial spacing apart of the respectively inner and outer wall regions, prevent buckling of the fiber composite materials 100, 200. Depending on the intended use, the depicted wall chambers 108, 208 can remain free or be provided with a filling, for example with lines or a stabilizing fill. When the wall chambers 108, 208 remain free, they can be used for example to transport fluids, making it possible inter alia to cool or heat the medium to be transported in the core tube.

Figure 3:
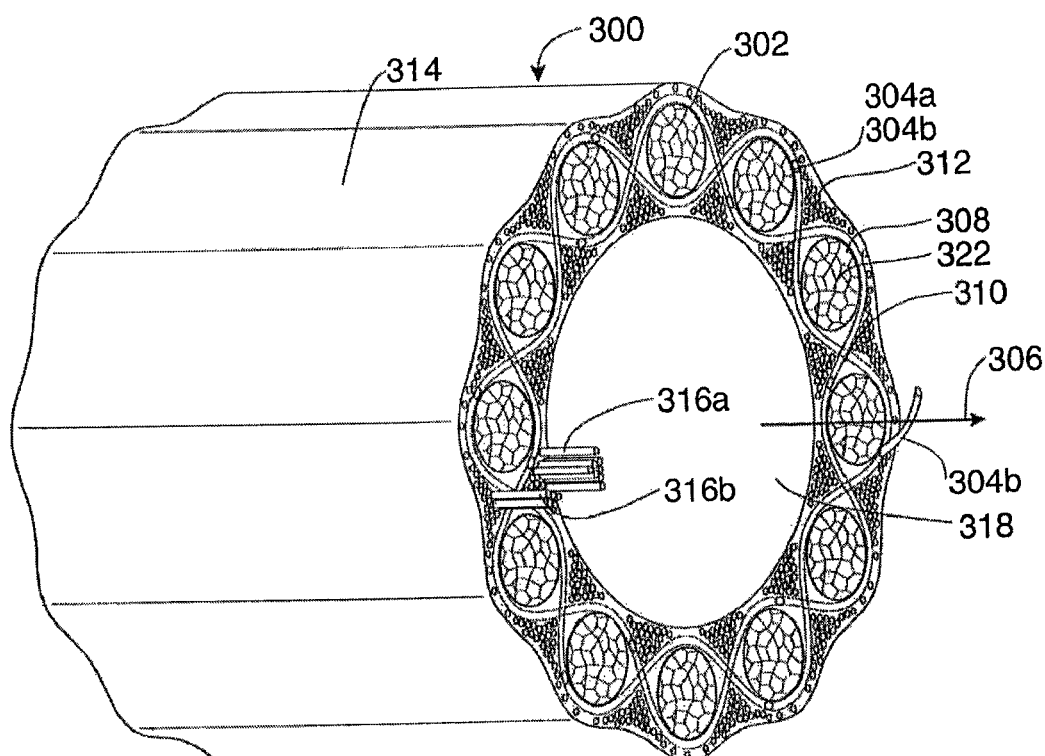

The embodiment of FIG. 3 differs from the embodiments of FIGS. 1 and 2 in two essential aspects. The fiber composite material 300 comprises as fiber component not only the circular braid 302 formed of right and left-handed fiber strands 304a, 304b, but also longitudinal fiber strands 316a, 316b which are oriented in the advance direction 306 and which have been embedded into the matrix material 312 in part as 316a within the circular braid 302 and in part as portion 316b outside the circular braid 302. The longitudinal fiber strands are disposed in particular in interstitial spaces between the left and right-handed fiber strands 304a, 304b in the region of the crossing zones 310. The fiber composite material 300 has enhanced stability to tensile loads as a result. The second essential difference to the embodiments of FIGS. 1 and 2 resides in the filling of all wall chambers 308. These are filled out by a consolidated foam 322, which endows the fiber composite material 300 with additional stability. The rod-shaped fiber composite material 300 depicted in FIG. 3 therefore permits any desired transportation of media to take place only through the core tube 318. In embodiments not depicted, however, only a portion of the wall chambers can be filled out with a consolidated foam, so that the other wall chambers can be used for other purposes.

Figure 4:
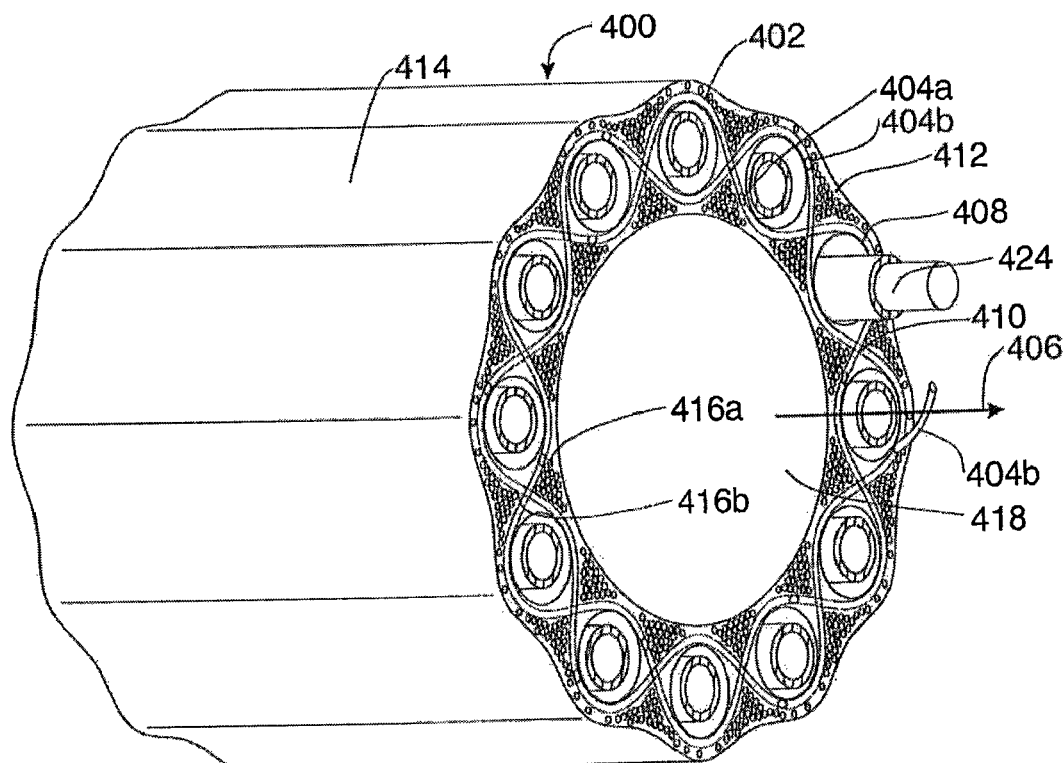

The fiber composite material depicted in FIG. 4 corresponds in principle to the fiber composite material of FIG. 3 except for this filling of cured foam 322. The free wall chambers 408, however, are inlaid with optical wave guides 424, which can transport data signals. Owing to the structure of the fiber composite material 400 with its high buckling resistance, good protection of the optical wave guides 424 is ensured even when the fiber composite material is subject to a high stress. The arrangement in various wall chambers 408, moreover, has the advantage that even in the event of an injury to the fiber composite material 400 it is generally the case that not all optical wave guides 424 are injured, since they are each protected separately by the circular braid 402.

Figure 5:
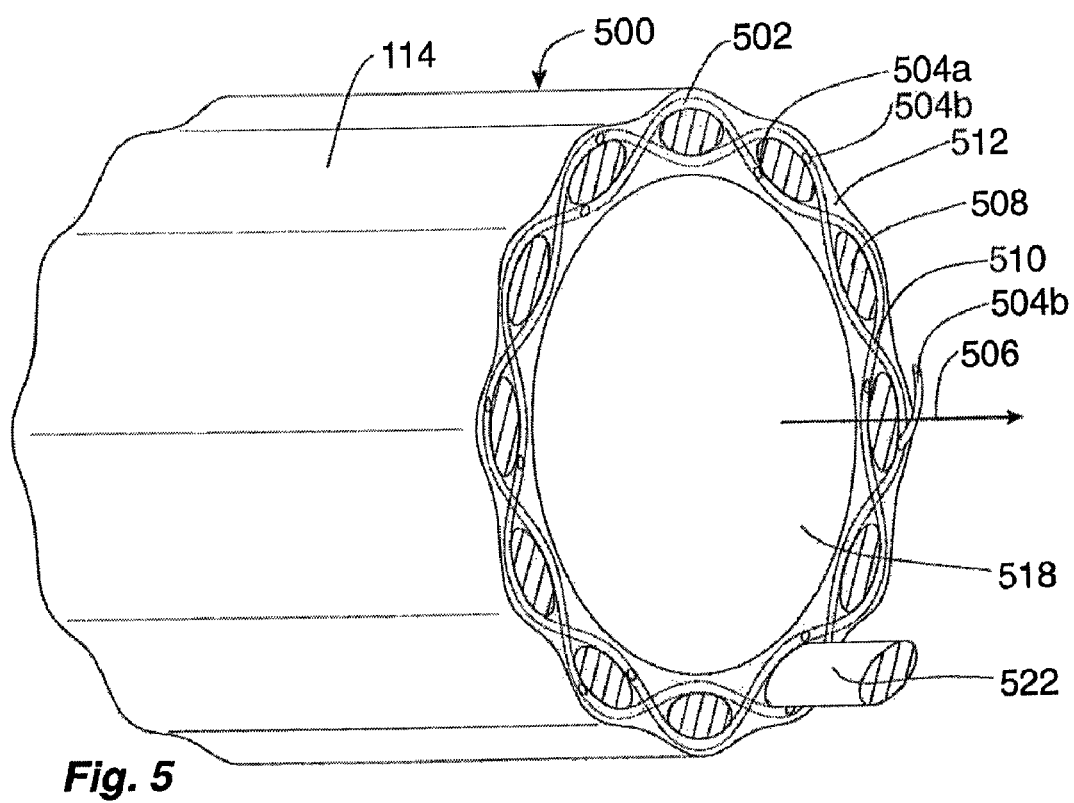

The fifth embodiment of an inventive fiber composite material, depicted in FIG. 5, corresponds to the embodiment of FIG. 2 with regard to the shape of the circular braid 502 and of the matrix material 512. However, the wall chambers 508 are similarly filled to the embodiments of FIGS. 3 and 4, the filling consisting in the form of stiff bars 522 of carbon fibers. The carbon fibers are bound into a binder. The bars fill the wall chambers 508 completely out, or do themselves form filled wall chambers 508 as it were. The phase boundary of the matrix 512 is thus immediately adjacent to the phase boundary of the carbon fiber bars 522. The purpose of the carbon fiber bars 522 is the defined absorption of tensile and compressive forces. In this embodiment, the circular braid 502 itself only secondarily serves to absorb such forces. Its primary office is to hold the carbon fiber bars 522 and protect them from giving way and breaking out. In addition, the circular braid 502 also ensures that the carbon fiber bars 522 are fixed with regard to their angle position around the longitudinal axis, so that this orientation does not change, which would otherwise lead to an irregular buckling resistance depending on the angle of a radial load. In the production of this embodiment, the fiber bars 522 serve as endless wall chamber formers and enduring mold cores.

In further embodiments, not depicted, of inventive fiber composite materials, the number of wall chambers can also differ from the depicted twelve wall chambers and be in particular higher.

Figure 6:
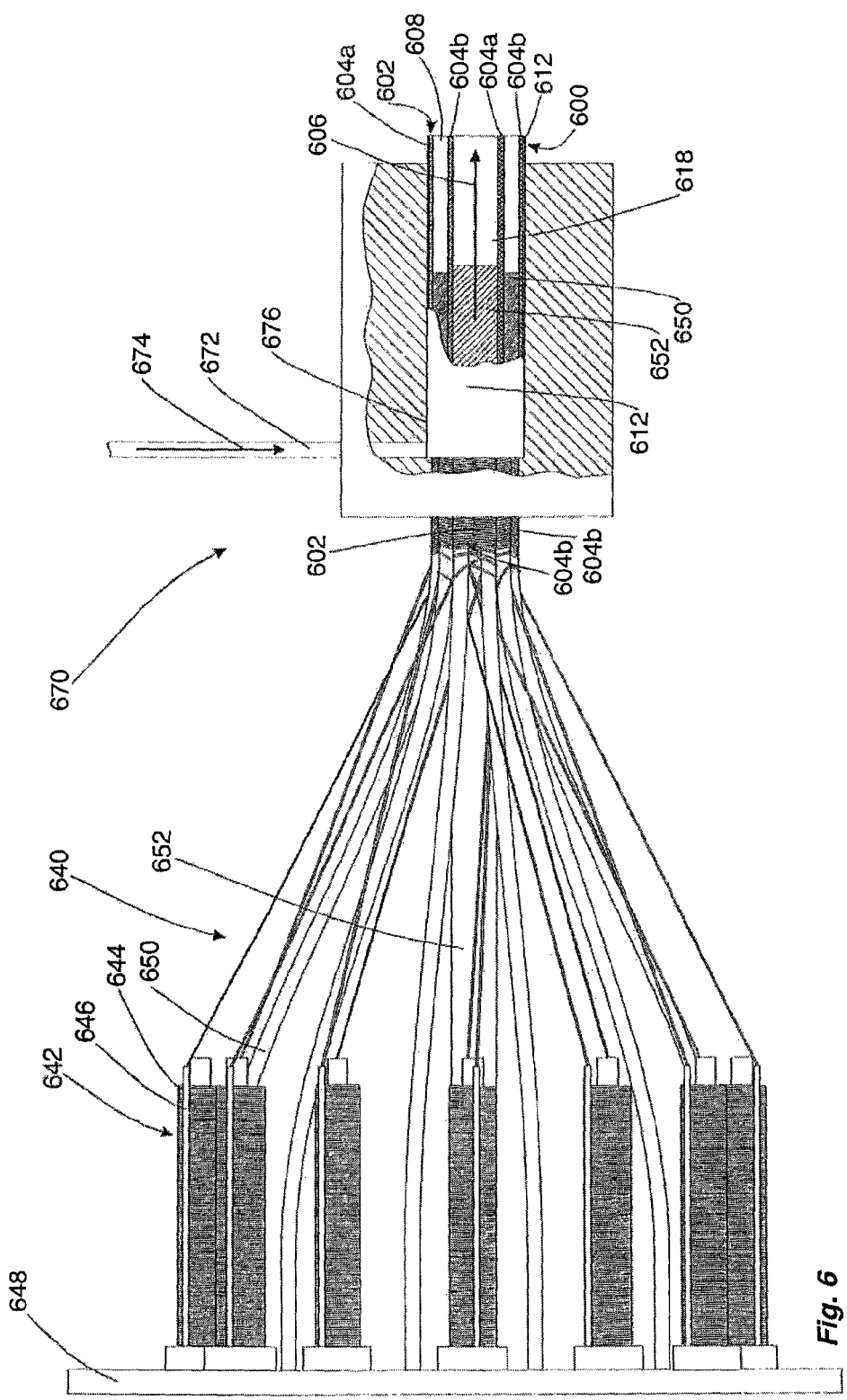
FIGS. 6 to 8 show various embodiments of inventive apparatuses for producing a rod-shaped fiber composite material.

FIG. 6 shows a first embodiment of an inventive apparatus for producing a fiber composite material 600, for example for producing a fiber composite material of the kind of the fiber composite material 200 depicted in FIG. 2. The apparatus comprises two main components 640, 670, of which the first main component is a braiding apparatus 640. The second apparatus is a combined applying and curing apparatus 670, in which a circular braid 602, produced by the braiding apparatus 640, is provided with a matrix material 612, and in which the matrix material 612 subsequently cures.

To produce the circular braid 602, the braiding apparatus 640 has, in a conventional manner, altogether twelve spools 642, which each have a fiber spindle 644 and an unwinding arm 646, with which the fiber material 604 for the circular braid 602 is taken off the fiber spindles 644 and fed to the circular braid 602. In a manner not evident from FIG. 6 but known in principle, the spools are guided essentially circularly on a guiding disk 648, six spools 642 at a time moving essentially in the clockwise direction and six spools 642 moving essentially counterclockwise. The spools each alternate in their movement between an inner and an outer track, so that the counter rotatory movement of the spools 642 does not lead to a collision of the spools 642. Between the tracks which are not depicted and in which the spools 642 are guided and which each constitute alternatingly via the circle circumference the inner or outer track as may be the case, wall chamber formers 650 are secured to the guiding plate 648, bend slightly toward each other and extend essentially in the advance direction, depicted with arrow 606, of the fiber composite material 600. These wall chamber formers 650 are orbited by the spools 642 in such a way that a circular braid 602 in which the fiber strands 604a, 604b are braided around the wall chamber formers 650 is formed in the manner depicted. This circular braid 602, unfolded and guided on the wall chamber formers 650, is further transported into the applying and curing apparatus 670, where it arrives in an applying chamber 676. A feed line 672, which ends in the applying chamber 676, presses a curable matrix material in the direction of the arrow 674 into the applying chamber 676, where it surrounds the circular braid 602 and embeds the individual fiber strands 604a, 604b of the circular braid 602. Only a core tube 618 remains free of the matrix 612, since a cylindrical mold core 652 extends from the guiding disk 648 of the braiding apparatus 640 as far as into the applying and curing apparatus 670, and the wall chambers 608 also remain free of the matrix 612, since the wall chamber formers 650 likewise extend into the applying and curing apparatus 670. In the course of the further transportation of the circular braid 602 and of the surrounding matrix 612, the matrix material 612 cures and the resulting stable fiber composite material 600 is conveyed out of the region of the wall chamber formers 650 and also of the mold core 652. Owing to the cured matrix material 612, the wall chambers 608 remain behind in a stable state.

Figure 7:
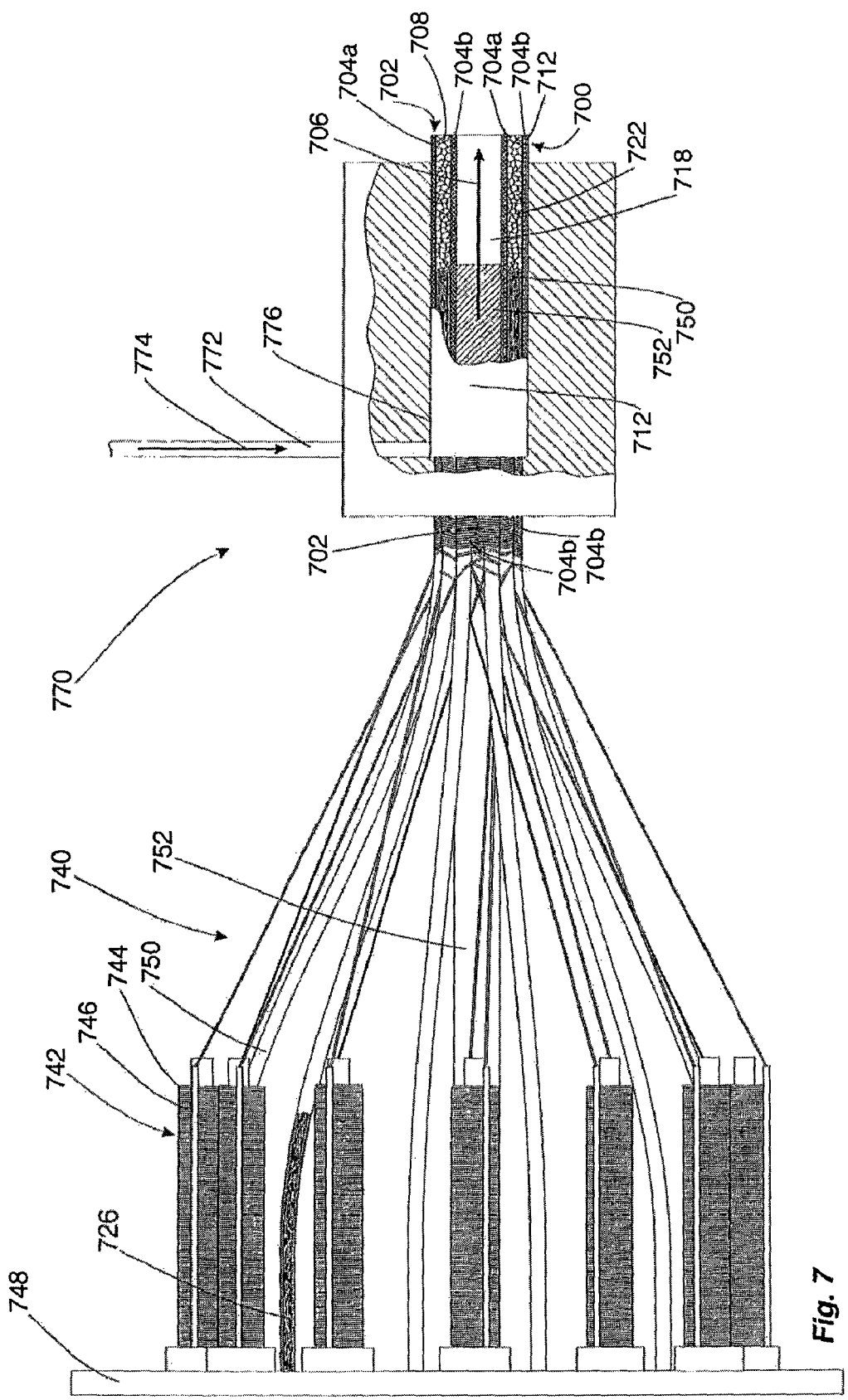

FIG. 7 shows a second embodiment of an inventive apparatus for producing a fiber composite material. The fiber composite material 700 produced using the apparatus of FIG. 7, similarly to the fiber composite material depicted in FIG. 3, has an additional stabilization in the form of a foam filling which, like the matrix material 712, also cures in the course of the production operation. This foam filling 722 is forced under pressure in the form of a liquid medium 726 through the wall chamber formers 750 into the wall chambers 708. The wall chamber formers 750, as illustratively depicted in section for one wall chamber former 750, is tubularly hollow for this purpose. The conveying apparatus for the medium 726 is not depicted in FIG. 7. The conveying apparatus is situated in the region of the braiding apparatus 740 and conveys the medium 726 through the guiding disk 748 into the wall chamber formers 750.

Figure 8:
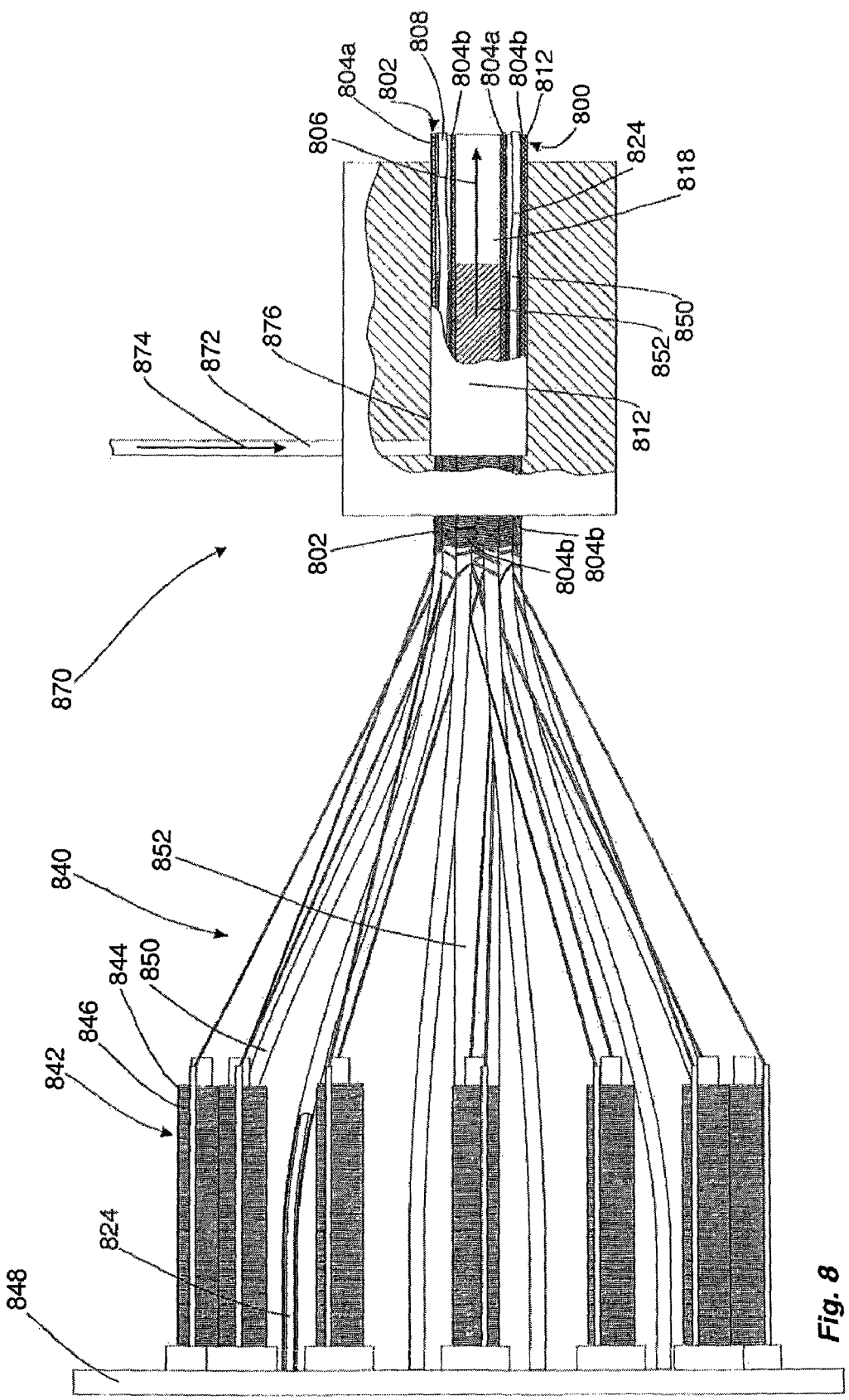

FIG. 8 depicts a third embodiment of an inventive apparatus for producing a fiber composite material. This apparatus corresponds essentially to the apparatus depicted in FIG. 7 in that a filling is introduced into the wall chambers 808 which are shaped by the wall chamber formers 850, with the feed again being through the wall chamber formers 850. However, the inlay fed in this case comprises optical wave guides 824 which are only loosely inlaid. The conveying appliance is not depicted, as was also the case for the apparatus of FIG. 7. However, the conveying appliance is likewise situated in the region of the braiding apparatus 840, although the optical wave guide 824, unlike medium 726 for the foam filling 722, is hauled off a drum before being introduced into the wall chambers 808.

In further embodiments of the inventive apparatus for producing a fiber composite material which are not depicted, the number of wall chamber formers and/or of spools differs from the depicted embodiments. More particularly, a higher number of spools is advantageous to obtain a particularly strong circular braid. The number of spools need not necessarily be equal to the number of wall chamber formers. There are advantageous apparatuses for example where 24 spools are used to braid around a total of twelve wall chamber formers.

When, in lieu of the tube-shaped wall chamber formers 850 and the optical wave guides 824 solid endless rods of bound fibers are carried along and embedded in the circular braid into the matrix material, this leads to the embodiment of FIG. 5.

Figure 9A:
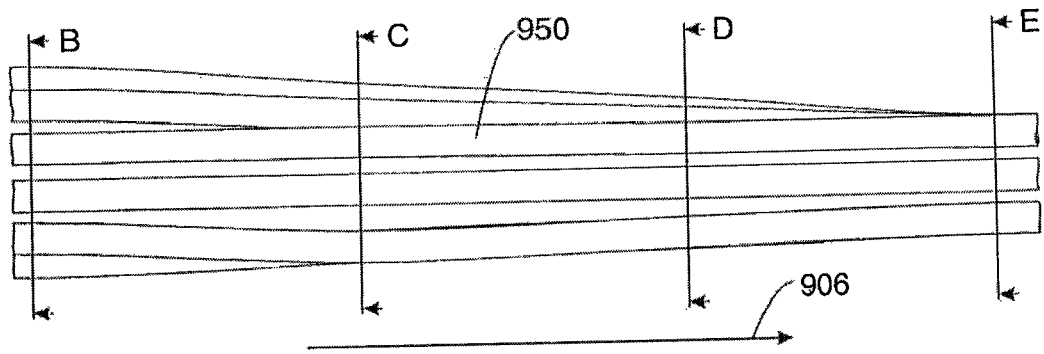
FIG. 9a shows sections of wall chamber formers of an inventive apparatus for producing a rod-shaped fiber composite material of trapeze-shaped cross section.

FIG. 9a shows a section of an arrangement of wall chamber formers 950 which are configured to reshape a circular braid 902 into a trapeze shape. Such an arrangement of wall chamber formers can find utility in apparatuses as depicted in FIGS. 6 to 8.

Figure 9B:
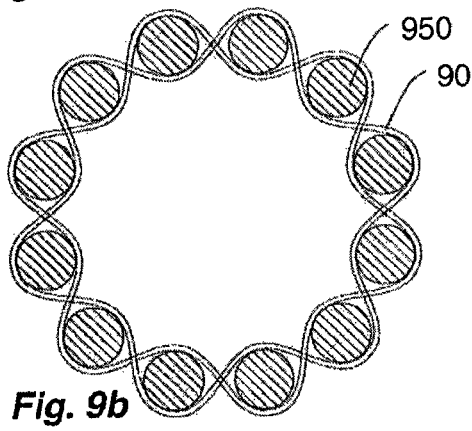
FIGS. 9b to 9e show a sectional view of the wall chamber formers depicted in FIG. 9a, at various positions in the direction of advance.

The wall chamber formers 950 are shaped such that their arrangement constantly changes in the advance direction 906. In a first region in the advance direction 906, the wall chamber formers form an arrangement B, which is depicted in FIG. 9b in cross section. In this arrangement B, the wall chamber formers 950 are disposed on a conjoint circular circumference. This is also the region in which the circular braid 902 is braided.

Figure 9D:
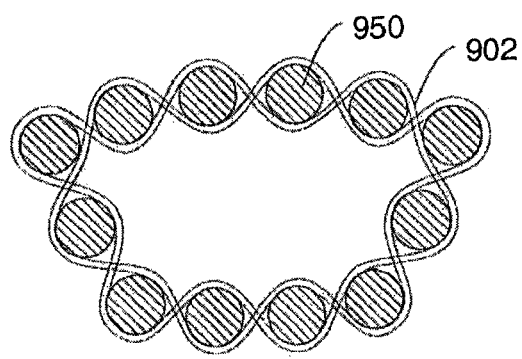
Figure 9C:
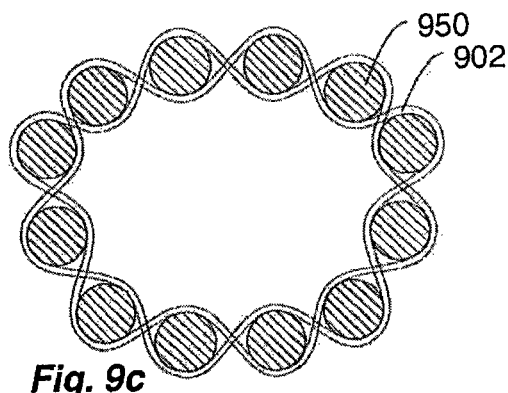

In a subsequent second region, depicted in FIG. 9c, the arrangement is already slightly changed in that the upper wall chamber formers 950 tend toward the center and the outer wall chamber formers 950 are veering toward the outside at left and at right. The resulting arrangement C reveals a slightly asymmetric shape in the vertical.

In a third region, depicted in FIG. 9d, the wall chamber formers 950 are each still further deflected in their particular direction compared with the original arrangement B. This arrangement D clearly reveals a trapeze shape.

Figure 9E:
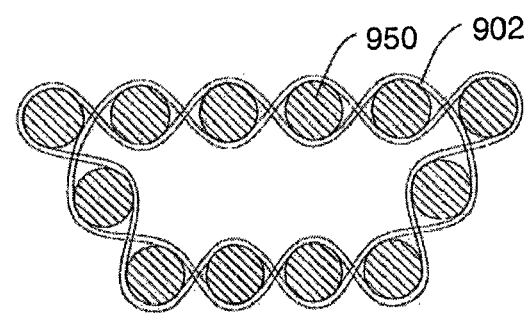

In the last region, depicted in FIG. 9e, the wall chamber formers 950 are in their trapeze-shaped target arrangement E.

The circular braid produced in the first region continuously changes its shape, as depicted in FIGS. 9b to 9e, in the course of continued transportation in direction 906, and ultimately assumes the trapeze shape in accordance with the orientation of the wall chamber formers 950. In this trapeze shape, the circular braid then arrives in a combined applying and curing apparatus (not depicted) which corresponds to that of the illustrative embodiments in FIGS. 6 to 8. After the matrix material has been introduced in the combined applying apparatus to embed the circular braid 902 and the matrix has cured, the fiber composite material having a trapeze-shaped cross section is ready produced.

Figure 9F:
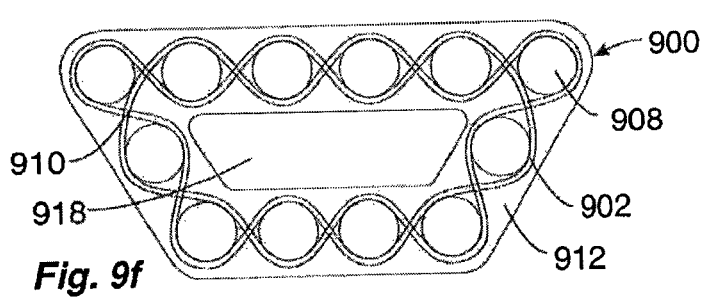
FIG. 9f shows an inventive fiber composite material whose trapeze-shaped cross section is due to the wall chamber formers depicted in FIGS. 9a to 9e.

The ready produced fiber composite material is depicted in FIG. 9f.

Nondepicted fiber composite materials produced similarly to the fiber composite material depicted in FIG. 9f are made with different cross-sectional shapes such as for example those of C- or LZ-beams. It may be advantageous in this connection to achieve the shaping not just via the wall chamber formers but additionally via a shaping appliance which changes in the advance direction and is disposed outside the circular braid.

The invention claimed is:

1. A rod-shaped fiber composite material having a wall composed of a tube-shaped circular braid formed from right-handed and left-handed helical strands of fiber material and a matrix material embedding the helical strands of the circular braid, characterized in that wall chambers extending in the longitudinal direction of the rod-shaped fiber composite material are formed in the region of the wall of the tube-shaped circular braid between the right-handed and left-handed helical strands and are bounded by a defined phase boundary of the matrix material, and at least one wall chamber is configured as a line for transportation of fluids or a line for transportation of fluids is inlaid into at least one of the wall chambers.

2. The rod-shaped fiber composite material according to claim 1 characterized in that fiber longitudinal strands likewise embedded in the matrix material within and/or outside the circular braid extend essentially in the longitudinal direction of the rod-shaped fiber composite material.

3. The rod-shaped fiber composite material according to claim 1 characterized in that at least one wall chamber is filled.

4. The rod-shaped fiber composite material according to claim 1 characterized in that a line is inlaid into at least one of the wall chambers.

5. The rod-shaped fiber composite material according to claim 1 characterized in that at least one of the wall chambers-contains an inlaid stabilizing inlay which fills out the wall chamber and has a defined external area.

6. The rod-shaped fiber composite material according to claim 1 characterized in that the phase boundaries separating the wall chambers and their respective contents from the matrix are smooth and the wall chambers have a cross section uniform in the longitudinal direction.

7. The rod-shaped fiber composite material according to claim 1 characterized in that within and/or outside the tube-shaped circular braid there is provided a further tube-shaped circular braid embedded in the matrix material, the further tube-shaped circular braid likewise having wall chambers arranged in the region of the wall between right-handed and left-handed strands and oriented in the longitudinal direction of the tube-shaped structure and separated from the matrix material by a phase boundary.

8. A process for producing a rod-shaped fiber composite material having a tube-shaped circular braid formed from left and right-handed helical strands and a matrix embedding the helical strands, characterized in that the tube-shaped circular braid is braided around rod-shaped wall chamber formers disposed in the region of the circular braid wall as mold cores to form a defined phase boundary, the wall chamber formers being braided into the region between crossing left and right-handed helical strands, and subsequently the matrix material for forming the matrix embedding the helical strands of the circular braid and for forming the defined phase boundary is introduced into the circular braid, the wall chamber formers remaining in the wall chambers at least until the matrix material is at least partly consolidated or cured, the wall chamber formers for forming free wall chambers are configured stationarily and continuously move out of the wall chambers formed in the region of the at least partly cured or consolidated matrix, and during the continuous moving out of the wall chamber formers a wall chamber filling is introduced into the wall chamber surrounded by at least partly cured matrix material.

9. The process according to claim 8, characterized in that the filling is configured as a prefabricated solid continuous inlay.

10. The process according to claim 8, characterized in that the filling is introduced as a flowable medium which consolidates after introduction in the wall chamber.

11. The process according to claim 8 characterized in that the circular braid is shaped before consolidation of the matrix material.

12. The process according to claim 11 characterized in that the shaping takes place with regard to the cross section.

13. The process according to claim 8 characterized in that at least two circular braids guided inside each or one another and the matrix material are joined together to form a rod-shaped fiber composite material, the wall chamber formers for forming the defined phase boundary being braided into at least one of the circular braids.

14. The process according to claim 13 characterized in that the process is carried out in two or more stages, a rod-shaped fiber composite material produced in a first stage, comprising a first circular braid, being surrounded in a second stage with a second circular braid and being connected to the latter by the matrix material.

15. Apparatus for continuous production of a rod-shaped fiber composite material comprising
- a braiding apparatus configured for braiding a circular braid,
- an applying apparatus for applying a matrix material to helical strands of the circular braid and
- a curing apparatus for curing the matrix material,
- characterized in that the braiding apparatus comprises rod-shaped wall chamber formers of defined cylindrical external surface which are disposed such that they are braided into the wall of the circular braid and extend through the applying apparatus into a region of the curing apparatus in which the matrix material has been at least partly cured or consolidated, and
- characterized in that it comprises an appliance for reshaping the circular braid after its production, and
- the wall chamber formers are shaped such that a pattern formed by the wall chamber formers changes downstream of a region in which the circular braid is produced compared with the original pattern such that the circular braid produced is continuously changed with regard to its cross section, as it advances.

16. The apparatus according to claim 15 characterized in that the applying apparatus for applying the matrix material and the curing apparatus are configured as a unitary apparatus.

17. Apparatus for continuous production of a rod-shaped fiber composite material comprising:
- a braiding apparatus configured for braiding a circular braid,
- an applying apparatus for applying a matrix material to helical strands of the circular braid and
- a curing apparatus for curing the matrix material,
- characterized in that the braiding apparatus comprises rod-shaped wall chamber formers of defined cylindrical external surface which are disposed such that they are braided into the wall of the circular braid and extend through the applying apparatus into a region of the curing apparatus in which the matrix material has been at least partly cured or consolidated, and
- characterized in that the wall chamber formers are tubularly hollow.

18. The apparatus according to claim 17 characterized in that the wall chamber formers are configured to feed a solid inlay into the wall chambers formed by the wall chamber formers.

19. The apparatus according to claim 18 characterized in that the wall chamber formers are configured to feed a pressurized flowable medium into the wall chambers produced by the wall chamber formers which consolidates or cures after introduction into the wall chambers.

20. A rod-shaped fiber composite material having a wall composed of a tube-shaped circular braid formed from right-handed and left-handed helical strands of fiber material and a matrix material embedding the helical strands of the circular braid, characterized in that
- wall chambers extending in the longitudinal direction of the rod-shaped fiber composite material are formed in the region of the wall of the tube-shaped circular braid between the right-handed and left-handed helical strands and are bounded by a defined phase boundary of the matrix material, and
- a line is inlaid into at least one of the wall chambers, in which the line is an electrical line or an optical wave guide.

21. The process according to claim 11 characterized in that the circular braid is shaped before embedding into the matrix material.

22. The process according to claim 12, characterized in that the shaping takes place through a force emanating from the wall chamber formers and/or from bounding external or internal surfaces of a mold.

23. The rod-shaped fiber composite material according to claim 20, characterized in that fiber longitudinal strands likewise embedded in the matrix material within and/or outside the circular braid extend essentially in the longitudinal direction of the rod-shaped fiber composite material.

24. The rod-shaped fiber composite material according to claim 20, characterized in that at least one wall chamber is filled.

25. The rod-shaped fiber composite material according to claim 20, characterized in that at least one of the wall chambers-contains an inlaid stabilizing inlay which fills out the wall chamber and has a defined external area.

26. The rod-shaped fiber composite material according to claim 20, characterized in that the phase boundaries separating the wall chambers and their respective contents from the matrix are smooth and the wall chambers have a cross section uniform in the longitudinal direction.

27. The rod-shaped fiber composite material according to claim 20, characterized in that within and/or outside the tube-shaped circular braid there is provided a further tube-shaped circular braid embedded in the matrix material, the further tube-shaped circular braid likewise having wall chambers arranged in the region of the wall between right-handed and left-handed strands and oriented in the longitudinal direction of the tube-shaped structure and separated from the matrix material by a phase boundary.

28. The apparatus according to claim 17, characterized in that the applying apparatus for applying the matrix material and the curing apparatus are configured as a unitary apparatus.

* * * * *